US008341744B1

(12) United States Patent
Obrecht et al.

(10) Patent No.: US 8,341,744 B1
(45) Date of Patent: Dec. 25, 2012

(54) REAL-TIME BEHAVIORAL BLOCKING OF OVERLAY-TYPE IDENTITY STEALERS

(75) Inventors: Mark Obrecht, Cupertino, CA (US); Zhixiong Wu, Sammamish, WA (US)

(73) Assignee: Symantec Corporation, Mountain View, CA (US)

( * ) Notice: Subject to any disclaimer, the term of this patent is extended or adjusted under 35 U.S.C. 154(b) by 1346 days.

(21) Appl. No.: 11/618,568

(22) Filed: Dec. 29, 2006

(51) Int. Cl.
*G06F 12/16* (2006.01)
(52) U.S. Cl. ............... 726/24; 726/23; 713/188
(58) Field of Classification Search .......... 726/24
See application file for complete search history.

(56) References Cited

U.S. PATENT DOCUMENTS

| | | | |
|---|---|---|---|
| 7,681,234 B2 * | 3/2010 | Florencio et al. | 726/22 |
| 7,694,328 B2 * | 4/2010 | Joshi et al. | 726/2 |
| 7,886,345 B2 * | 2/2011 | Kaliski et al. | 726/6 |
| 2006/0075494 A1 * | 4/2006 | Bertman et al. | 726/22 |
| 2006/0080735 A1 * | 4/2006 | Brinson et al. | 726/22 |
| 2006/0253446 A1 * | 11/2006 | Leong et al. | 707/9 |
| 2006/0277605 A1 * | 12/2006 | Curtis et al. | 726/24 |
| 2007/0039038 A1 * | 2/2007 | Goodman et al. | 726/2 |
| 2007/0112814 A1 * | 5/2007 | Cheshire | 707/101 |
| 2007/0128899 A1 * | 6/2007 | Mayer | 439/152 |
| 2007/0245422 A1 * | 10/2007 | Hwang et al. | 726/26 |

* cited by examiner

*Primary Examiner* — Kambiz Zand
*Assistant Examiner* — Amare F Tabor
(74) *Attorney, Agent, or Firm* — Fenwick & West LLP

(57) ABSTRACT

Behavioral blocking of overlay-type identity stealers is achieved by detecting a transactional web page session, evaluating a property of a window corresponding to a process running on the computer system, and then, based on a result of the evaluation, blocking a behavior of the process for a duration of the transactional web page session. The evaluation of the property window involves determining whether the window exhibits one or more characteristics representing activity of an overlay-type identity stealer.

27 Claims, 4 Drawing Sheets

REAL-TIME BEHAVIORAL BLOCKING OF OVERLAY-TYPE IDENTITY STEALERS

BACKGROUND

As the Internet continues to expand in terms of both connectivity and number of users, the amount of malicious software ("malware") existing across the Internet continues to increase at a significant rate. Malware, in the form of, for example, viruses, Trojan horses, spyware, backdoor viruses, and worms, is essentially software code written to infiltrate and/or damage a computer system. In general, such malware spreads across computer systems via e-mail and file downloads over the Internet. In some worst case scenarios, malware can destroy important data, render a computer system virtually useless, and/or bring down a network of hundreds or thousands of computer systems. Recovering a computer system or network from a successful malware attack often requires considerable resources. Further, malware, while typically attacking computer systems connected to the Internet, can also spread from one computer system to the other by, for example, a non-Internet based file transfer between computer systems.

In another worst case scenario not listed above, malware can be used to surreptitiously gather information about a user in an effort to subsequently misappropriate such information to the user's detriment (e.g., stealing bank account information). These types of malware are used to facilitate "identity theft," which typically occurs over the Internet ("on-line identity theft"). For example, "phishing"-type malware is used to trick an individual into providing confidential information (e.g., username, password, social security number, birth date, bank account number, credit card number) in response to an e-mail solicitation (or other forms of solicitation) appearing to be associated with a legitimate or official entity or purpose.

While identity theft malware commonly operates by gathering information over the Internet, a particular class of identity theft malware resides locally on a user's machine. One type of such malware are "keyloggers," which record every key press (and in some cases, every action) a user makes when using his/her computer system. The recorded data is then, without knowledge of the user, sent over the Internet (or some other network) to a third party seeking to gain information for identity theft purposes. Another type of locally resident identity theft malware captures screenshots of user sessions and then secretly passes the captured screenshots to some unknown third party, who can then review the screenshots to obtain confidential information.

In addition to keyloggers and screen capture malware, there exists malware that overlays a locally hosted, phony window with input fields over one or more input fields of a legitimate web page. The goal of such malware, commonly referred to as "overlay-type" identity stealers, is to dupe a user into entering legitimate credentials into fraudulently placed input fields. The fake overlay windows themselves are not Internet web pages or parts thereof; rather, they are application windows instantiated by one or more processes locally running on the computer system. Overlay-type identity stealers are primarily used in connection with user accesses to "transactional" web pages, which are those provided to facilitate some sort of transaction between the user and a host or content provider of the transactional web page. For example, web sites of financial institutions (e.g., banks) commonly include web pages that customers can use to gain access to their accounts upon the user being authenticated. The authentication process generally involves the user providing some set of requested login credentials (e.g., username, password, account number, personal identification number (PIN), social security number, response to a challenge question).

One approach to guard against the deleterious effects associated with overlay-type identity stealers relies on the use of malware "signatures." As well known in the art, a "signature" of a particular type of malware is the binary pattern of the malware. Various anti-malware programs rely on signatures to detect, identify, and remediate specific malware. Such use of signatures for malware detection is reactive in nature in that signatures are determined and used for malware detection after the malware has already been distributed and the effects thereof reported and documented. In the case of overlay-type identify stealers, the use of malware signatures is not very effective because as this type of malware does not have to achieve high proliferation in order to be successful, such malware is oftentimes not picked up by large anti-malware providers on the lookout for widely distributed and openly damaging forms of malware. Further, overlay-type identity stealers can adapt to the particular web page at hand, and thus, may be thought of as being unhelpfully amorphous in the context of signature-based malware detection.

SUMMARY

According to at least one aspect of one or more embodiments of the present invention, a computer-implemented method of protecting a computer system against malware includes: detecting initiation of a transactional web page session; evaluating a property of a window corresponding to a process running on the computer system; and dependent on a result of the evaluation, blocking a behavior of the process for a duration of the session.

According to at least one other aspect of one or more embodiments of the present invention, a system for protecting against malware on a computer system includes: a detection module arranged to detect initiation of a transactional web page session; an evaluation module arranged to evaluate a property of a window corresponding to a process running on the computer system; and a blocking module arranged to, dependent on the evaluation, block a behavior of the process for a duration of the session.

According to at least one other aspect of one or more embodiments of the present invention, a computer-readable medium has instructions stored therein that are executable by a processor to: detect initiation of a transactional web page session; evaluate a property of window corresponding to a process running on the computer system; and block, dependent on a result of the evaluation, a behavior of the process for a duration of the session.

According to at least one other aspect of one or more embodiments of the present invention, a method of protecting a computer system against malware includes evaluating a window property of a process running on the computer system in response to detecting access to an Internet web page by the computer system; and dependent on the evaluation indicating that the window property constitutes an overlay-type identity stealer threat, modifying a display behavior of the window property.

The features and advantages described herein are not all inclusive, and, in particular, many additional features and advantages will be apparent to those skilled in the art in view of the following description. Moreover, it should be noted that the language used herein has been principally selected for readability and instructional purposes and may not have been selected to circumscribe the present invention.

Each of the figures referenced above depict an embodiment of the present invention for purposes of illustration only. Those skilled in the art will readily recognize from the following description that one or more other embodiments of the structures, methods, and systems illustrated herein may be used without departing from the principles of the present invention.

DETAILED DESCRIPTION

In the following description of embodiments of the present invention, numerous specific details are set forth in order to provide a more thorough understanding of the present invention. However, it will be apparent to one skilled in the art that the present invention may be practiced without one or more of these specific details. In other instances, well-known features have not been described in detail to avoid unnecessarily complicating the description.

In general, embodiments of the present invention relate to a technique for guarding against one or more behaviors exhibited by overlay-type identity stealer malware threats. Particularly, in one or more embodiments, an anti-malware engine (e.g., anti-malware software) employs behavioral blocking to prevent an overlay-type identity stealer from gaining user information (as opposed to, for example, attempting to prevent an overlay-type identity stealer attack based on detection of a signature of a known overlay-type identity stealer).

Figure 1:
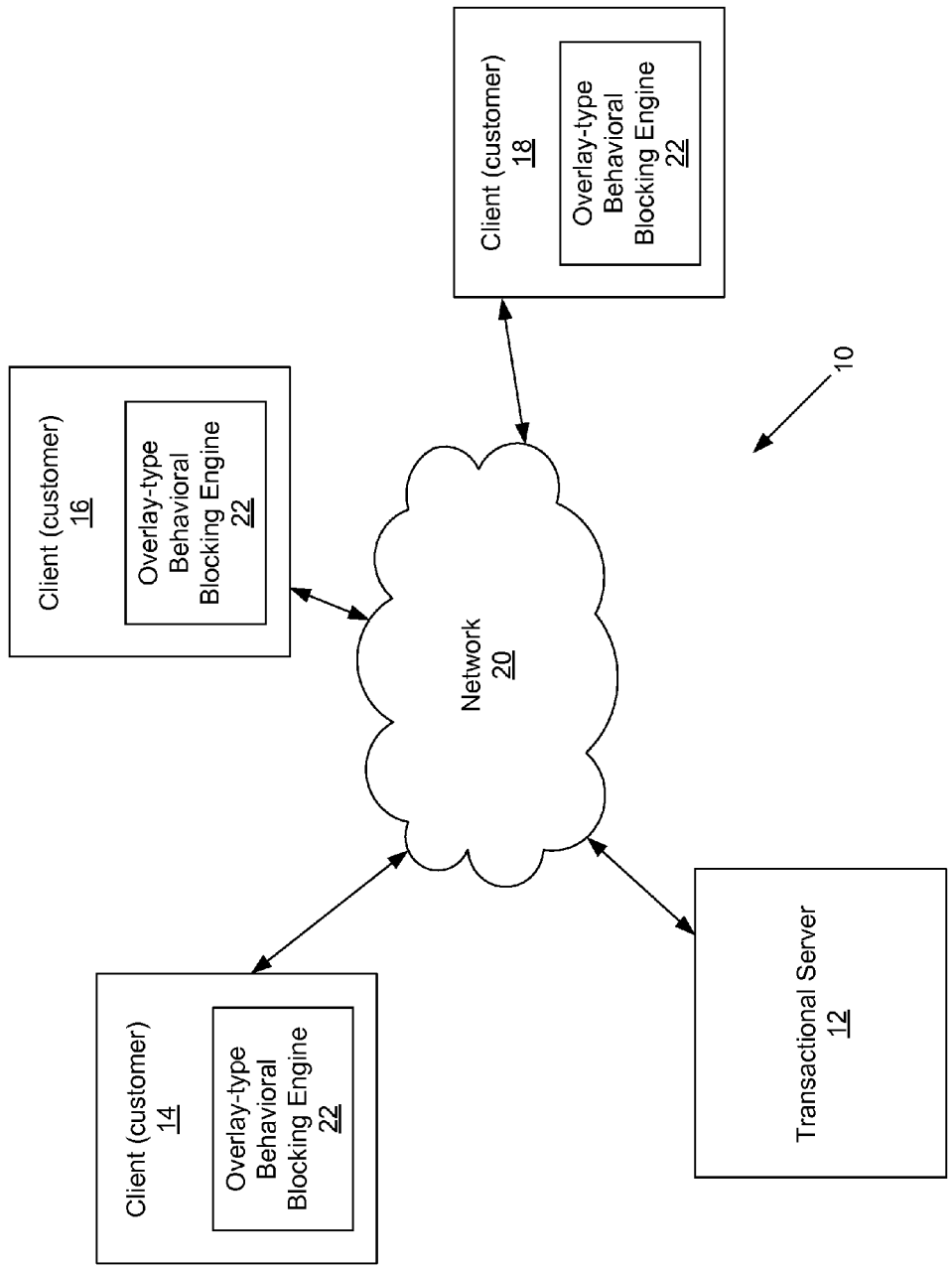
FIG. 1 shows a computing environment in accordance with an embodiment of the present invention.

FIG. 1 shows a computing environment 10 in accordance with an embodiment of the present invention. The computing environment 10 includes a "server" system 12 and a plurality of "client" (or "local") systems 14, 16, 18 connected over a network 20. In one context, as illustrated in FIG. 1, the server 12 may be a transactional server associated with a particular financial institution (e.g., a bank, an investment brokerage firm), and the client systems 14, 16, 18 may be associated with clients or customers of that financial institution. Thus, in other words, the transactional server 12 can serve up, for a particular financial institution, web pages requested by one or more customers seeking to gain on-line access to their accounts. However, it is noted that the server 12 is in no way limited to only being associated with financial institutions—the server 12 may be associated with any entity that relies on the server 12 to serve up one or more web pages that a user can access to partake in any sort of transaction with the entity.

The network 20 may be a local area network (LAN) (e.g., an enterprise network) or a wide area network (WAN) (e.g., the Internet). Further, the network 20 may be formed of links using technologies such as Ethernet, 802.11 (wireless interface), an integrated services digital network (ISDN), a digital subscriber line (DSL), and/or an asynchronous transfer mode (ATM). Further, networking protocols used on the network 20 may include multiprotocol label switching (MPLS), a transmission control protocol/Internet protocol (TCP/IP), a User Datagram Protocol (UDP), a hypertext transport protocol (HTTP), a simple mail transfer protocol (SMTP), and/or a file transfer protocol (FTP). Data exchanged over the network 20 may be represented using technologies and/or formats such as a hypertext markup language (HTML), an extensible markup language (XML), and/or a simple object access protocol (SOAP). Moreover, some or all of the links across the network 20 may be encrypted using encryption technologies such as a secure sockets layer (SSL), a secure hypertext transport protocol (HTTPS), and/or a virtual private network (VPN). In one or more embodiments, communication over the network 20 may be based on custom and/or dedicated means instead of, or in combination with, the technologies described above.

In general, the server 12 services, over the network 20, requests from the clients 14, 16, 18. Further, although FIG. 1 shows a single server 12, one or more other embodiments may involve any number of server systems. The clients 14, 16, 18 represent the plurality of clients that might be connected to the network 20. In one or more embodiments, one or more of the clients 14, 16, 18 may be personal computers (e.g., laptops, desktops) having an operating system platform using Windows® by Microsoft Corporation, MacOS by Apple Computer, Inc., Linux, and/or UNIX. Moreover, in one or more embodiments, one or more of the clients 14, 16, 18 may be other network-enabled electronic devices such as mobile computing devices (e.g., cellular telephones, personal digital assistants (PDAs), portable e-mail devices).

Still referring to FIG. 1, each of the clients 14, 16, 18 is shown as having an overlay-type behavioral blocking engine 22. As further described in detail below with reference to FIGS. 2 and 3, the overlay-type behavioral blocking engine 22 provides anti-malware functionality for protecting the respective clients 14, 16, 18 against locally resident overlay-type identity stealers. Further, it is noted that in one or more embodiments, the overlay-type behavioral blocking engine 22 is software, hardware, or a combination thereof locally resident on the respective client system 14, 16, 18. Thus, in other words, in one or more embodiments, functionality or operation of the overlay-type behavioral blocking engine 22 need not be dependent on a particular data connection over the network 20.

Figure 2:
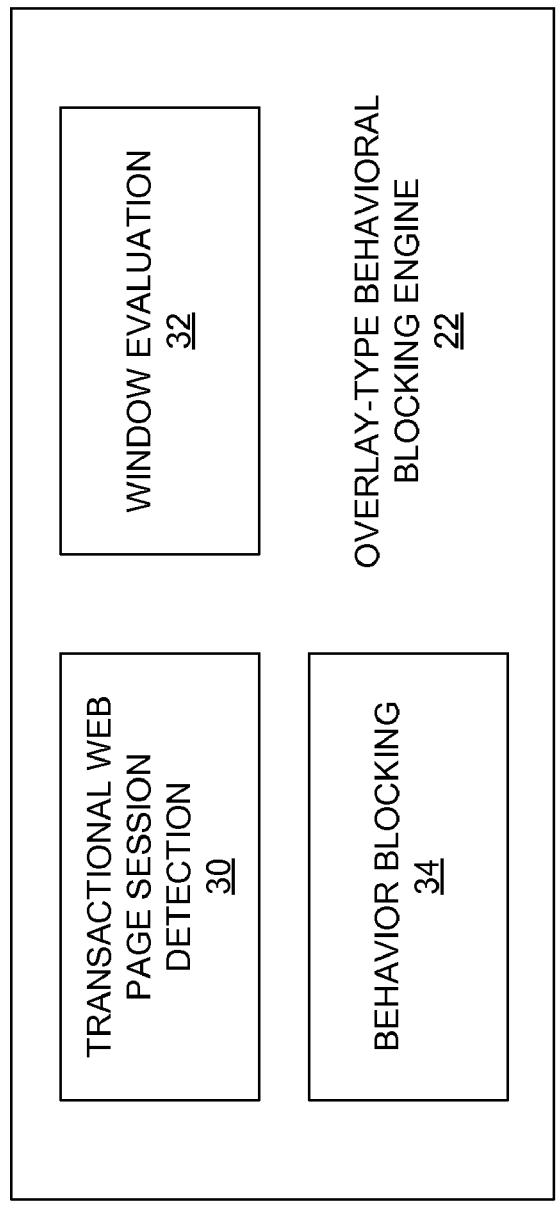
FIG. 2 shows an overlay-type identity stealer behavioral blocking engine in accordance with an embodiment of the present invention.

FIG. 2 shows an overlay-type identity stealer behavioral blocking engine 22 in accordance with an embodiment of the present invention. As shown in FIG. 2, behavioral blocking engine 22 has a plurality of modules, where a "module" is defined herein as any program, logic, and/or functionality implemented in hardware and/or software.

The behavioral blocking engine 22 includes a transactional web page session detection module 30. As described above, a "transactional web page" is one that facilitates some type of transaction between a user (e.g., client, customer) and a host (e.g., a financial institution). A "transactional web page session" refers to the period of time, or the pendency of a connection, during which the user is accessing, or has open, the transactional web page.

The transactional web page session detection module 30 detects an initiation of a transactional web page session. In other words, the detection module 30 detects when a user accesses a transactional web page. This may be determined by, for example, detecting that communication with an accessed web page is secure (e.g., encrypted over an HTTPS connection). Further, the detection module 30 may analyze the source code (e.g., HTML) of an accessed web page to determine whether or not the web page contains one or more input fields. The presence of an input field in an HTML-based web page may be detected by looking for an <input/> tag in the source code for the web page. Thus, in one or more embodiments, the detection module 30 detects an initiation of a transactional web page session when a user accesses a web page, the connection to which is made secure by the host and the content of which is determined to contain one or more input fields.

Further, in one or more embodiments, the detection module 30 may query a database, either local or remote, having a store of some set of uniform resource locators (URLs) (colloquially, "web addresses") of transactional web pages. In this manner, when a user points his/her web browser to one of the stored URLs, the detection module 30 automatically marks the initiation of a transactional web page session.

Still referring to FIG. 2, the behavioral blocking engine 22 has a window evaluation module 32. When the detection module 30 has detected the initiation of a transactional web page session, the behavioral blocking engine 22 may be thought of as placing the attendant computer system in an overlay-type behavioral blocking mode. In this mode, the window evaluation module 32, in general, carries out, in real-time, one or more of several tasks to behaviorally identify one or more windows generated by overlay-type identity stealer threats. Initially, in one or more embodiments, the window evaluation module 32 may enumerate all running processes on the system. Thereafter, all window properties for those processes may be enumerated and associated with the owning processes. Enumeration of window properties may include identifying live window handles and window objects. Upon determining live window properties, the window evaluation module 32 may then evaluate those properties to discover, for example, which are top-level windows, are child windows, are visible windows, have regular input fields (e.g., based in HTML source code), have custom input fields (e.g., coded in Visual Basic or Delphi), do not have borders, have invisible borders, and/or have non-browser type windows (e.g., windows of a type not typically associated with Microsoft Internet Explorer® (or other type of web browser)). Based on some combination of the presence or lack of these window properties, the window evaluation module 32 may make a determination as to which windows generated by running processes should be deemed behaviorally malicious and constitute an overlay-type identity stealer threat. For example, if a particular window has a custom input field and is of a non-browser type, the window evaluation module 32 may deem the process associated with that window as constituting an overlay-type identity stealer threat.

Further, in addition to the properties described above, the window evaluation module 32 may examiner one or more other properties. For example, the window evaluation module 32 may assess properties of a detected input field—if the input field is read-only, disabled, or grayed out, the window evaluation module 32 may deem the input field as likely not being placed by an overlay-type identity stealer. In another example, the window evaluation module 32 may determine whether a particular window has a title bar—if the window has a title bar, the window evaluation module 32 may deem the window as likely not being placed by an overlay-type identity stealer because improper placement of the title bar might lead to suspicion. Further still, the window evaluation module 32 may determine whether a particular window has tabs—if the window has tabs, the window evaluation module 32 may deem the window as being valid because it would be highly unlikely that a fraudulently placed window, the effectiveness of which almost solely rests with the "blending in" of the window with an underlying web page, would have tabs potentially exposing the window as being fake. Moreover, the window evaluation module 32 may determine whether a window has a taskbar button for the whole process—if the window has such a taskbar button, the window evaluation module 32 may mark the window as being valid as it would be unlikely that a fraudulently placed window would have a taskbar button for the whole process. Further, for example, the window evaluation module 32 may determine whether a window has a pane showing a system icon—if the window shows such an icon, the window evaluation module 32 may deem the window to be valid because it would be unlikely for a fake window to be coupled to a system-level icon. Still further, the window evaluation module 32 may determine whether a window is associated with a process that has been authenticated (e.g., digitally signed), in which case the window would be deemed valid.

Still referring to FIG. 2, the behavioral blocking engine 22 has a behavior blocking module 34. As described above, the window evaluation module 32 evaluates window properties to determine which running processes constitute an overlay-type identity stealer threat. These processes are indicated to the behavior blocking module 34, which then, in general, blocks behavior of the processes from adversely affecting a transactional web page session. In one or more embodiments, the behavior blocking module 34 may actually suppress (not necessarily terminate) a window property of a particular process. For example, if a window is determined to have a custom input field and be of a non-browser type, the behavior blocking module 34 may cause that window to be invisible for a pendency of the transactional web page session. Further, in one or more embodiments, the behavior blocking module 34 may effectively move a false window that is overlaying a legitimate input field off the screen where it is not visibly presented to dupe an unsuspecting user. The behavior blocking module 34 may continue to block overlay-type identity stealer behavior throughout the period of a particular transactional web page session (i.e., the behavior blocking module 34 blocks behavior during the transactional web page session). Thus, in other words, once the user ends his/her transactional web page session (as indicated, for example, by the detection module 30), the behavior blocking module 34 may cease the blocking of behavior previously blocked during the session.

It is noted that in one or more embodiments, the behavior blocking module 34 does not necessarily terminate a process, suspicious or otherwise. This is because, for example, a process having a suspicious window may nonetheless still be a legitimate process. Accordingly, one or more embodiments may be thought of as being directed to assessing and blocking window behavior, as opposed to evaluating whether a process is malicious (based on, for example, signature-based or "scan and convict" detection).

Further, as evident from the description above, in one or more embodiments, functionality of the window evaluation module 32 and the behavior blocking module 34 may be activated only when the detection module 30 detects the initiation of a transactional web page session. In this manner, false positives that might otherwise occur if the window evaluation module 32 and the behavior blocking module 34 were always active, regardless of whether a transactional web page is being accessed, may be mitigated. Further still, it is noted that in one or more embodiments, the behavior blocking module 34 blocks suspicious overlay-type behavior in real-time, i.e., such behavior is blocked as it is detected (as opposed to having to wait in a typical "scan and convict" approach).

Figure 3:
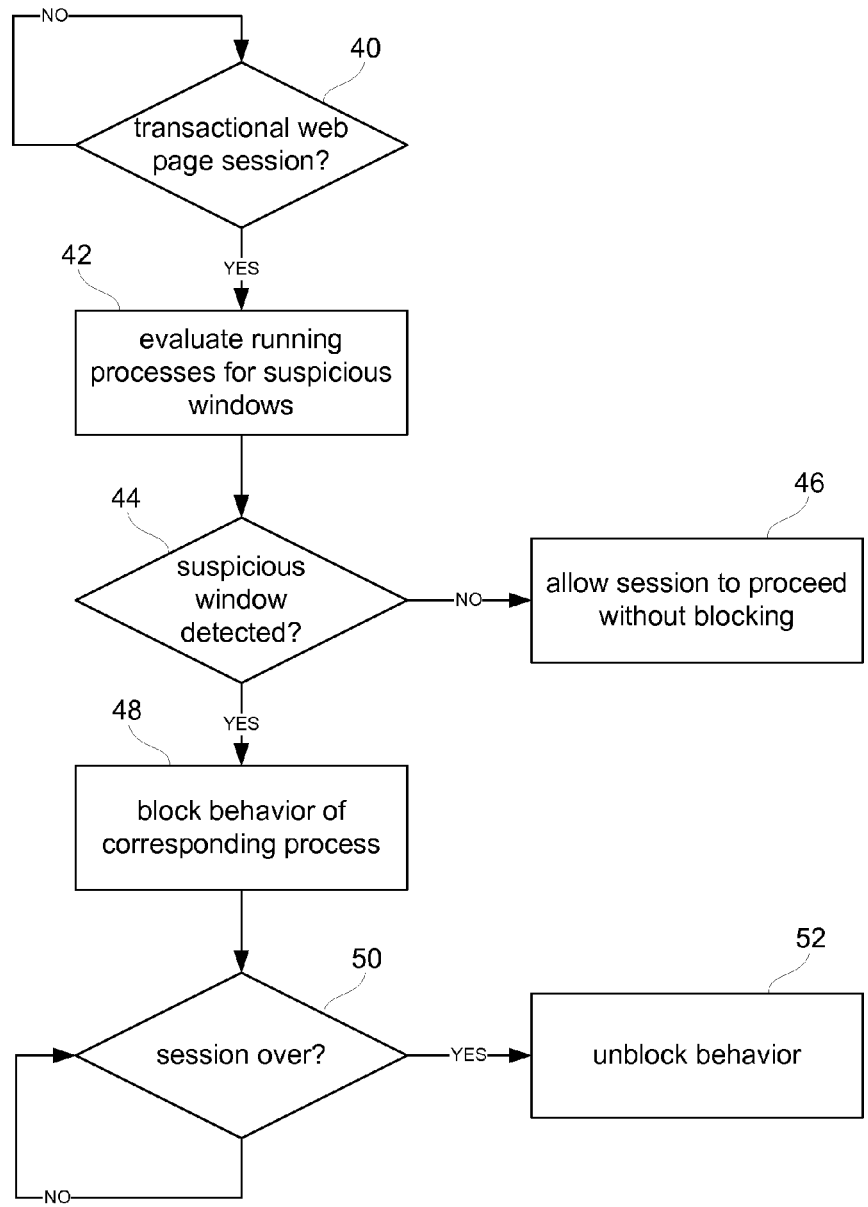
FIG. 3 shows a flow process in accordance with an embodiment of the present invention.

FIG. 3 shows an exemplar flow process in accordance with an embodiment of the present invention. In particular, FIG. 3 shows a flow process for the overlay-type identity stealer behavioral blocking engine 22 described above with reference to FIGS. 1 and 2. Initially, the behavioral blocking engine 22, in step 40, detects for the initiation of a transactional web page session. If and when a transactional web page is accessed, the behavioral blocking engine 22, in step 42, evaluates processes running on the system to determine for the presence of suspicious windows. If a suspicious window is not detected, the behavioral blocking engine 22, in step 46, allows the transactional web page session to continue without behavior blocking. However, if a suspicious window is detected, the behavioral blocking engine 22, in step 48, blocks the behavior of the process corresponding to the suspicious window. In one or more embodiments, the behavioral blocking engine 22 may block all aspects of the process's behavior, while, in one or more other embodiments, the behavioral blocking engine 22 may block particular aspects of the process's behavior. Once the behavioral blocking engine 22, in step 50, determines that the transactional web page session has ended, the behavioral blocking engine 22, in step 52, unblocks the previously blocked behavior.

Figure 4:
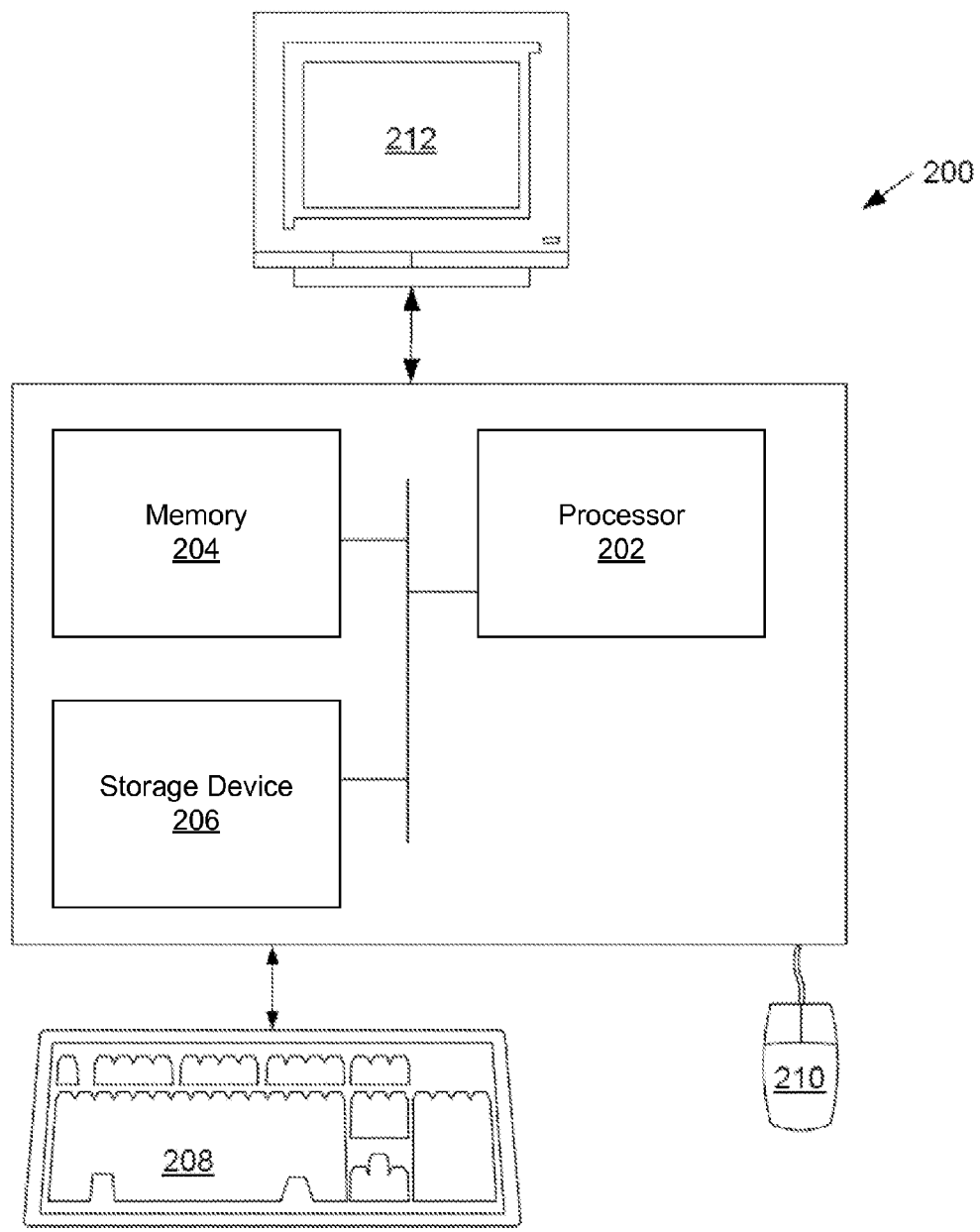
FIG. 4 shows a computer system in accordance with an embodiment of the present invention.

Further, one or more embodiments of the present invention may be associated with virtually any type of computer system, including multiprocessor and multithreaded uniprocessor systems, regardless of the platform being used. For example, as shown in FIG. 4, a networked computer system 200 (e.g., any of systems 14, 16, or 18) includes at least one processor (e.g., a general-purpose processor, a field-programmable gate array (FPGA), an application-specific integrated circuit (ASIC), a graphics processor) 202, associated memory (e.g., random access memory (RAM), read-only memory (ROM)) 204, a storage device (e.g., a hard drive, an optical drive) 206, and numerous other elements (not shown) and functionalities typical of modern computer systems. The networked computer system 200 may also include input means (e.g., a keyboard 208, a mouse 210) and output means (e.g., a monitor 212). The networked computer system 200 may be connected to a LAN or a WAN via a network interface connection (not shown). Those skilled in the art will appreciate that these input and output means may take other forms. Further, those skilled in the art will appreciate that one or more elements of the networked computer system 200 may be remotely located and connected to the other elements over a network. Further, software instructions to perform one or more embodiments of the present invention may be stored on a computer-readable medium such as a compact disc (CD), digital video disc (DVD), a diskette, a tape, a file, a universal serial bus (USB) "memory stick", or any other computer-readable storage device.

While the invention has been described with respect to a limited number of embodiments, those skilled in the art, having benefit of the above description, will appreciate that other embodiments may be devised which do not depart from the scope of the present invention as described herein. Accordingly, the scope of the present invention should be limited only by the appended claims.

What is claimed is:

1. A computer-implemented method of protecting a computer system against malware, comprising:
   detecting initiation of a legitimate transactional web page session having an associated transactional web page;
   enumerating processes running on the computer system responsive to the detected initiation of the transactional web page session;
   enumerating window properties of windows associated with the running processes;
   evaluating at least one window property of a window associated with a process running on the computer system to determine whether the window property indicates that the process is an overlay-type identity stealer that overlays the window associated with the process over the legitimate transactional web page to dupe a user into entering credentials into the overlaid window, the evaluation comprising determining whether the process associated with the window has been authenticated and determining that the process is not an overlay-type identity stealer responsive at least in part to the process associated with the window having been authenticated; and
   blocking a behavior of the process for a duration of the session responsive to determining that the window property of the window associated with the process indicates that the process is an overlay-type identity stealer.

2. The computer-implemented method of claim 1, further comprising:
   detecting an input field in the legitimate transactional web page;
   wherein evaluating at least one window property comprises:
      determining whether the window associated with the process is overlaid over the input field of the legitimate transactional web page; and
      determining that the process is an overlay-type identity stealer responsive at least in part to a determination that the window associated with the process is overlaid over the input field of the legitimate transactional web page.

3. The computer-implemented method of claim 1, wherein blocking the behavior of the process comprises:
   not terminating the process.

4. The computer-implemented method of claim 1, wherein blocking the behavior of the process comprises:
   suppressing the window associated with the process by causing the window associated with the process to be invisible for a pendency of the transactional web page session.

5. The computer-implemented method of claim 1, wherein blocking the behavior of the process comprises:
   moving the window associated with the process so that the window does not overlay the legitimate transactional web page.

6. The computer-implemented method of claim 1, wherein evaluating the at least one window property of the window comprises:
   determining whether the window associated with the process is at least one of a top-level window, a child window, a visible window, and a non-browser type window; and
   determining that the process is an overlay-type identity stealer responsive at least in part to a determination that the window associated with the process is of a non-browser type.

7. The computer-implemented method of claim 1, wherein evaluating the at least one window property of the window comprises:
   determining whether the window associated with the process has one of a standard input field and a custom input field; and
   determining that the process is an overlay-type identity stealer responsive at least in part to a determination that the window associated with the process has a custom input field.

8. The computer-implemented method of claim 1, wherein evaluating the at least one window property of the window comprises:
   evaluating a property of an input field of the window associated with the process; and
   determining whether the process is an overlay-type identity stealer responsive at least in part to the evaluated property of the input field of the window associated with the process.

9. The computer-implemented method of claim 1, wherein evaluating the at least one window property of the window comprises:

determining whether the window associated with the process has at least one of: a title bar, a tab, a selection icon for the process and a system-level icon; and determining that the process is not an overlay-type identity stealer responsive at least in part to the window associated with the process having at least one of a title bar, a tab, a selection icon for the process, or a system-level icon.

10. The computer-implemented method of claim 1, further comprising:

unblocking the behavior in response to a termination of the transactional web page session.

11. A system for protecting against malware on a computer system, comprising:

a non-transitory computer-readable storage medium having executable modules stored therein, the modules comprising:

a detection module arranged to detect initiation of a legitimate transactional web page session having an associated transactional web page;

an enumeration module arranged to enumerate processes running on the computer system and enumerate window properties of windows associated with the running processes responsive to the detected initiation of the transactional web page session;

an evaluation module arranged to:
evaluate at least one window property of a window associated with a process running on the computer system to determine whether the window property indicates that the process is an overlay-type identity stealer that overlays the window associated with the process over the legitimate transactional web page to dupe a user into entering credentials into the overlaid window, wherein the evaluation comprises determining whether the process associated with the window has been authenticated; and determine that the process is not an overlay-type identity stealer responsive at least in part to the process associated with the window having been authenticated; and a blocking module arranged to block a behavior of the process for a duration of the session responsive to determining that the window property of the window associated with the process indicates that the process is an overlay-type identity stealer; and a processor for executing the modules.

12. The system of claim 11, wherein the detection module is further arranged to:

detect an input field in the legitimate transactional web page;

wherein the evaluation module is further arranged to:
determine whether the window associated with the process is overlaid over the input field of the legitimate transactional web page; and determine that the process is an overlay-type identity stealer responsive at least in part to a determination that the window associated with the process is overlaid over the input field of the legitimate transactional web page.

13. The system of claim 11, wherein the blocking module is further arranged to at least one of suppress the window associated with the process by causing the window associated with the process to be invisible for a pendency of the transactional web page session and move the window associated with the process so that the window does not overlay the legitimate transactional web page.

14. The system of claim 11, wherein the evaluation module is further arranged to:

determine whether the window associated with the process is at least one of a top-level window, a child window, a visible window, and a non-browser type window; and determine that the process is an overlay-type identity stealer responsive at least in part to a determination that the window associated with the process is of a non-browser type.

15. The system of claim 11, wherein the evaluation module is further arranged to:

determine whether the window associated with the process has at least one of a standard input field, a title bar, a tab, a selection icon for the process, and a system-level icon; and determine that the process is not an overlay-type stealer responsive at least in part to the window associated with the process having at least one of a standard input field, a title bar, a tab, a selection icon for the process, or a system-level icon.

16. The system of claim 11, wherein the evaluation module is further arranged to:

evaluate a property of an input field of the window associated with the process; and determine whether the process is an overlay-type identity stealer responsive at least in part to the evaluated property of the input field of the window associated with the process.

17. The system of claim 11, wherein the blocking module is further arranged to unblock the behavior in response to a termination of the transactional web page session.

18. A non-transitory computer-readable medium having instructions stored therein that are executable by a processor, the instructions comprising instructions to:

detect initiation of a legitimate transactional web page session having an associated transactional web page;

enumerate processes running on the computer system responsive to the detected initiation of the transactional web page session;

enumerate window properties of windows associated with the running processes;

evaluate at least one window property of a window associated with a process running on the computer system to determine whether the property indicates that the process is an overlay-type identity stealer that overlays the window associated with the process over the legitimate transactional web page to dupe a user into entering credentials into the overlaid window, the evaluation comprising determining whether the process associated with the window has been authenticated and determining that the process is not an overlay-type identity stealer responsive at least in part to the process associated with the window having been authenticated; and block a behavior of the process for a duration of the session responsive to determining that the window property of the window associated with the process indicates that the process is an overlay-type identity stealer.

19. The computer-readable medium of claim 18, wherein the instructions to detect initiation of the legitimate transactional web page session comprise instructions to:

detect an input field in the legitimate transactional web page;

wherein evaluating at least one window property comprises:
determining whether the window associated with the process is overlaid over the input field of the legitimate transactional web page; and determining that the process is an overlay-type identity stealer responsive at least in part to a determination that the window associated with the process is overlaid over the input field of the legitimate transactional web page.

20. The computer-readable medium of claim 18, wherein the instructions to block the behavior of the process comprise instructions to at least one of suppress the window associated with the process by causing the window associated with the process to be invisible for a pendency of the transactional web page session and move the window associated with the so that the window does not overlay the legitimate transactional web page.

21. The computer-readable medium of claim 18, wherein the instructions to evaluate the at least one window property comprise instructions to:
  determine whether the window associated with the process is at least one of a top-level window, a child window, a visible window, and a non-browser type window; and
  determine that the process is an overlay-type identity stealer responsive at least in part to a determination that the window associated with the process is of a non-browser type.

22. The computer-readable medium of claim 18, wherein the instructions to evaluate the at least one window property comprise instructions to:
  determine whether the window associated with the process has at least one of a standard input field, a title bar, a tab, a selection icon for the process, and a system-level icon;
  determine that the process is not an overlay-type stealer responsive at least in part to the window associated with the process having at least one of a standard input field, a title bar, a tab, a selection icon for the process, or a system-level icon.

23. The computer-readable medium of claim 18, further comprising instructions to:
  unblock the behavior in response to a termination of the transactional web page session.

24. A method of protecting a computer system against malware, comprising:
  using the computer system to perform steps comprising:
    enumerating processes running on the computer system and window properties of windows associated with the running processes in response to detecting access to a legitimate Internet web page;
    evaluating a window property of a window associated with a process running on the computer system to determine whether the property indicates that the process is an overlay-type identity stealer threat that overlays the window associated with the process over the legitimate Internet web page to dupe a user into entering credentials into the overlaid window, the evaluation comprising determining whether the process associated with the window has been authenticated and determining that the process is not an overlay-type identity stealer responsive at least in part to the process associated with the window having been authenticated; and
    modifying a display behavior of the window property responsive to determining that the window property of the window associated with the process indicates that the process is an overlay-type identity stealer.

25. The method of claim 24, wherein modifying the display behavior comprises at least one of:
  moving the window associated with the process so that the window does not overlay the legitimate Internet web page; and
  causing the window associated with the process to be invisible for a pendency of the Internet web page.

26. The computer-readable medium of claim 18, wherein the instructions to evaluate the window property comprise instructions to:
  evaluate a property of an input field of the window associated with the process; and
  determine whether the process is an overlay-type identity stealer responsive at least in part to the evaluated property of the input field of the window associated with the process.

27. The computer-implemented method of claim 1, wherein evaluating at least one window property of the window associated with the running process comprises:
  determining whether the at least one window property indicates that the window associated with the process is overlaying and blending in with the legitimate transactional web page; and
  determining that the process is an overlay-type identity stealer responsive at least in part to a determination that the window is overlaying and blending in with the legitimate transactional web page.

* * * * *